(12) United States Patent
Francois

(10) Patent No.: US 10,732,573 B2
(45) Date of Patent: Aug. 4, 2020

(54) COMFORTABLE ELASTOMER MATERIAL

(71) Applicant: Omega SA, Biel/Bienne (CH)

(72) Inventor: Nicolas Francois, Neuchatel (CH)

(73) Assignee: Omega SA, Biel/Bienne (CH)

( * ) Notice: Subject to any disclaimer, the term of this patent is extended or adjusted under 35 U.S.C. 154(b) by 158 days.

(21) Appl. No.: 16/060,816

(22) PCT Filed: Jun. 22, 2016

(86) PCT No.: PCT/EP2016/064439
§ 371 (c)(1),
(2) Date: Jun. 8, 2018

(87) PCT Pub. No.: WO2017/097439
PCT Pub. Date: Jun. 15, 2017

(65) Prior Publication Data
US 2018/0373203 A1  Dec. 27, 2018

(30) Foreign Application Priority Data
Dec. 11, 2015 (EP) ................................ 15199632

(51) Int. Cl.
| G04B 37/22 | (2006.01) |
| C08K 3/22 | (2006.01) |
| C08K 3/38 | (2006.01) |
| C08K 5/00 | (2006.01) |
| C08L 21/00 | (2006.01) |
| C08K 3/015 | (2018.01) |
| C08K 7/02 | (2006.01) |
| A44C 27/00 | (2006.01) |

(52) U.S. Cl.
CPC ............ *G04B 37/225* (2013.01); *C08K 3/015* (2018.01); *C08K 3/22* (2013.01); *C08K 3/38* (2013.01); *C08K 5/0058* (2013.01); *C08K 7/02* (2013.01); *C08L 21/00* (2013.01); *G04B 37/22* (2013.01); *A44C 27/001* (2013.01); *C08K 2003/2296* (2013.01); *C08K 2003/385* (2013.01); *C08L 2205/16* (2013.01)

(58) Field of Classification Search
CPC ........ G04B 37/225; G04B 37/22; C08K 3/22; C08K 3/38; C08K 5/0058; C08K 3/015; C08K 7/02; C08K 2003/2296; C08K 2003/385; C08L 21/00; C08L 2205/16; A44C 27/001
See application file for complete search history.

(56) References Cited

U.S. PATENT DOCUMENTS

| 2009/0175135 A1 | 7/2009 | Moore et al. |
| 2013/0197131 A1 | 8/2013 | Fujikura |
| 2017/0056682 A1* | 3/2017 | Kumar .................. A61N 1/046 |

FOREIGN PATENT DOCUMENTS

| CN | 201563751 U | 9/2010 |
| EP | 2 468 127 A1 | 6/2012 |
| EP | 2 620 295 A1 | 7/2013 |

OTHER PUBLICATIONS

International Search Report dated Sep. 1, 2016, in PCT/EP2016/064439 filed Jun. 22, 2016.

* cited by examiner

Primary Examiner — Sanza L. McClendon
(74) Attorney, Agent, or Firm — Oblon, McClelland, Maier & Neustadt, L.L.P.

(57) ABSTRACT

An elastomer material for a wristband or components for horology configured to be in contact with skin, the elastomer material including a moisture wicking mechanism. The wicking mechanism includes hydrophilic microfibers capable of wicking away and neutralizing moisture through the material.

14 Claims, 1 Drawing Sheet

COMTABLE ELASTOMER MATERIAL

CROSS-REFERENCE TO RELATED APPLICATIONS

This is a National phase Application in the United States of International patent Application PCT/EP2016/064439 filed on Jun. 22, 2016 which claims priority of the European patent Application No. 15199632.9 filed on Dec. 11, 2015. The entire disclosures of the above patent applications are hereby incorporated herein by reference.

FIELD OF THE INVENTION

The present invention concerns the technical field of elastomer-based materials. More specifically, the invention concerns an elastomer material for manufacturing timepieces, and a method for manufacturing parts and the parts obtained.

BACKGROUND OF THE INVENTION

Numerous elastomer materials exist on the market and are known for their use in wristbands, for example, for their quality of comfort, soft feel and strength.

Thus, it is known from Japanese Patent No JP2000204265 to make a thermoplastic elastomer material having antibacterial qualities and offering good resistance to ageing.

However, the elastomer materials used for wristbands or components for horology in contact with the skin do not allow perspiration to be wicked away properly, as the antibacterial properties simply neutralize unpleasant odours. Further, the wristbands are often subjected to friction or abrasion which tends to remove a certain amount of the antibacterial agent and thereby reduce its effectiveness.

SUMMARY OF THE INVENTION

It is a particular object of the invention to overcome the various drawbacks of these known techniques.

More specifically, it is an object of the invention to provide a material adapted for making parts of elastomer material intended to be in prolonged contact with the skin (directly or indirectly), and to obtain an elastomer with properties allowing comfort to be improved, while maintaining good colourability and good resistance to ageing (UV, perspiration, aesthetics).

These objects, in addition to others which will appear more clearly hereinafter, are achieved by the invention by means of an elastomer material for wristbands or components for horology intended to be in contact with the skin, the elastomer material including means for wicking away moisture.

According to the invention, the wicking means include hydrophilic microfibers forming channels in the elastomer material in order to transport the moisture by capillary action and neutralize the moisture through said material.

In accordance with other advantageous variants of the invention:
the elastomer material includes thermally conductive fillers chosen from zinc oxide or boron nitride;
the elastomer material contains an antimicrobial additive of the organic zinc compound or silver salts or aluminium salts type;
the material is chosen from polyurethane, polyether block amide, copolyester elastomers, acrylic elastomers or styrene elastomers;
the material is chosen from hot vulcanizable elastomers such as fluoroelastomers, acrylonitrile butadiene copolymers, silicones, or ethylene propylene diene monomer;
the material is chosen from cold vulcanizable elastomers such as silicones;
the hydrophilic microfibers have a fineness of less than 150 mTex;
the hydrophilic microfibers are made of a synthetic material from the polyamide or polyester family;
the hydrophilic microfibers are made of a cellulosic material such as cotton, or linen or synthetic derivatives such as viscose;
the hydrophilic microfibers have a cross-section with n channels, where n>2;
the cross-section of the hydrophilic microfibers has an oblong shape with grooves or a helical shape.

The invention also concerns in particular any timepiece made of elastomer material according to the invention.

The invention also concerns a method of manufacturing a wristband comprising at least one portion made of elastomer material, the elastomer material including at least hydrophilic microfibers, thermally conductive fillers and an antimicrobial additive.

The manufacturing method includes the following steps:
forming a mixture from the elastomer material;
adding to the mixture obtained in the first step at least hydrophilic microfibers, thermally conductive fillers and an antimicrobial additive;
forming the wristband from the mixture obtained in the second step by means of a moulding process.

According to this method, the elastomer material is chosen from thermoplastic elastomers and hot or cold vulcanizable elastomers.

The invention also concerns a method of assembling a wristband obtained by a manufacturing method according to the invention, including the following steps:
forming a first layer of a wristband intended to be in contact with the skin;
assembling an aesthetic layer on top of the first layer; the aesthetic layer may be leather, fabric, polymer or any other decorative element.

BRIEF DESCRIPTION OF THE DRAWINGS

Other characteristics and advantages of the invention will appear more clearly upon reading the following description of a specific embodiment of the invention, given simply by way of illustrative and non-limiting example, and the annexed Figures, among which.

DETAILED DESCRIPTION OF PREFERRED EMBODIMENTS

Figure 1:
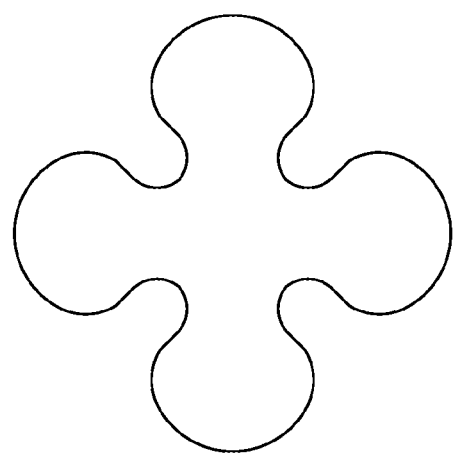
FIGS. 1 and 2 illustrate a cross-sectional view of hydrophilic fibres present in the elastomer material according to the invention.
Figure 1:
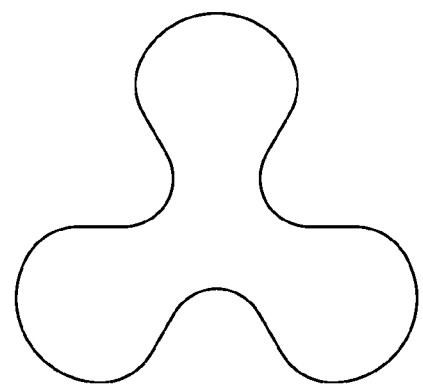

The invention concerns an elastomer material for a wristband or components for horology intended to be in contact with the skin, the elastomer material including moisture wicking means, characterized in that the wicking means include hydrophilic microfibers capable of wicking away and neutralizing moisture through the material.

According to a preferential embodiment of the invention, the elastomer material contains thermally conductive fillers having a thermal conductivity of more than 20 W·m−1·K−1, such as a zinc oxide or a hexagonal boron nitride. The content of these thermally conductive fillers can be up to 40 mass % and they allow the thermal conductivity of the material to be increased to 12 W·m−1·K−1 without thereby increasing the electrical conductivity of the latter. Such thermally conductive fillers have the advantage of better evacuating body heat and thus limiting perspiration.

According to an advantageous aspect of the invention, the elastomer material may contain an antimicrobial additive, such as an organic zinc compound or silver salts or aluminium salts, in order to limit or prevent unpleasant odours developing on the surface and inside the material, essentially due to the user's perspiration when the wristband is in contact with the skin, for example.

As required, the antibacterial agent can be combined with the elastomer and conductive filler mixture with a content of 2 to 6 mass %.

The elastomer material for the wristband or components for horology can be chosen from one or more thermoplastic elastomers, such as polyurethane, polyether block amide, copolyester elastomers, acrylic elastomers or styrene elastomers.

According to another embodiment of the invention, the material is chosen from hot vulcanizable elastomers such as fluoroelastomers, acrylonitrile butadiene copolymers, silicones, or ethylene propylene diene monomer.

According to yet another embodiment of the invention, the material is chosen from cold vulcanizable elastomers, such as silicones.

The hardness of the elastomer material may be chosen across a range from 20 Shore 00 to 90 Shore D according to haptic and functional requirements.

It is possible to mould hard elements for a case with hardnesses of 90 Shore D for example, whereas the Shore 00 and Shore A materials will preferably be used as a coating on a hard element. Flexible parts such as wristbands will be made from a Shore A hardness.

For example, in the case of a watch case, the elastomer can be sprayed on the surface of the case and serve as coating or be overmoulded to provide a soft feel.

According to the invention, the mixture of elastomer, conductive fillers and antibacterial agent is taken and mixed with hydrophilic microfibers which are pretreated to improve affinity with the mixture. As required, the hydrophilic microfiber content is between 8 and 25 mass % so as to reach the percolation threshold.

By way of reminder, percolation occurs when the agent that moves inside the pores of the structure is capable of passing right through the latter. In the present case, the structure is represented by the elastomer material, the pores are represented by the hydrophilic microfibers and the agent moving through the material is the perspiration.

At the percolation threshold in the mixture, the microfibers touch each other and form channels improving the power of dispersion of the matrix formed by the elastomer material by up to a thousand times, and the moisture can then be transported by capillary action through the material and thus evacuated.

According to the present invention, the hydrophilic microfibers have a fineness of less than 150 mTex, which is a sufficient size for transporting the H$_2$O type molecules.

Advantageously, the hydrophilic microfibers can be made of a synthetic material from the polyamide or polyester family, since they quickly transport moisture owing to their hydrophilic functions and also dry very quickly.

According to another embodiment of the invention, the hydrophilic fibres can be made of a cellulosic material such as cotton or linen or from synthetic derivatives such as viscose, which are also suitable for wicking moisture.

According to the invention, the microfibers preferably have a helical cross-section to give them a larger specific surface area and thus a faster power of dispersion.

Figure 2:
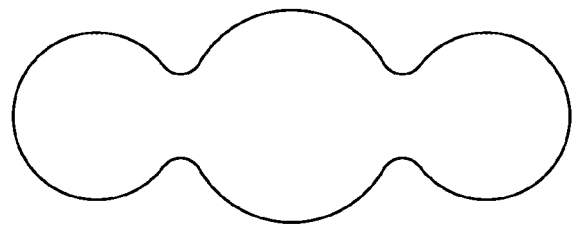
Figure 2:
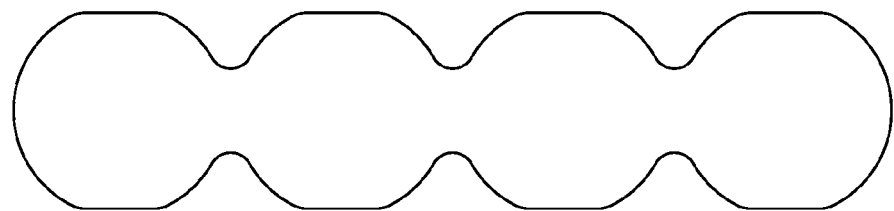

More specifically, and as illustrated in FIGS. 1 and 2, the cross-section of the hydrophilic fibres is helical with n blades where n is strictly more than two, in order to offer a large specific surface area and thus promote moisture wicking.

The invention also concerns at least one wristband portion made of elastomer material according to the invention.

The mixture described hereinbefore can be directly moulded to form wristband portions made of elastomer mono-material, or overmoulded to form comfortable bimaterial wristband portions, each portion having a first lower part of comfortable material in contact with the skin, and an upper portion made of a material advantageous for its function. It is also possible to envisage each of the portions having a different colour purely for aesthetic purposes.

The invention also concerns a method of manufacturing a wristband comprising at least one portion made of elastomer material, the elastomer material including at least hydrophilic microfibers, thermally conductive fillers and an antimicrobial additive.

According to the invention, the manufacturing method includes the following steps:
  forming a mixture from the elastomer material;
  adding to the mixture obtained in the first step at least hydrophilic microfibers, thermally conductive fillers and an antimicrobial additive;
  forming the wristband from the mixture obtained in the second step by means of a moulding process.

According to the requirements of those skilled in the art and the parts to be made, the elastomer material can be chosen from thermoplastic elastomers, hot or cold vulcanizable elastomers, or a mixture of such materials.

The invention also concerns a method of assembling a wristband obtained by the manufacturing method of the invention and including the following steps:
  making a first layer of a wristband made of elastomer material according to the invention and intended to be in contact with the skin in order to wick away perspiration;
  assembling an aesthetic layer on top of the first layer; the aesthetic layer may be leather, fabric, polymer or any other decorative element.

Such an advantageous material for improving comfort allows the manufacture of timepieces or pieces of jewelry such as bracelets, straps or wristbands, buckles, necklaces, cases, case backs, push buttons, loops or bezels. It is also noted that the material may prove very advantageous for the manufacture of spectacle frames, and in particular the arms, bridge and pads.

Of course, the present invention is not limited to the illustrated example and is capable of various variants and modifications that will appear to those skilled in the art.

The invention claimed is:

1. An elastomer material for wristbands or components for horology intended to be in contact with skin, the elastomer material comprising:
  moisture wicking means, wherein the wicking means includes hydrophilic microfibers made of a synthetic material from the polyamide or polyester family, the microfibers forming channels in the elastomer material to transport moisture by capillary action through the material; and thermally conductive fillers selected from zinc oxide and boron nitride.

2. The elastomer material according to claim 1, including an antimicrobial additive of organic zinc compound or silver salts or aluminium salts type.

3. The elastomer material according to claim 1, wherein the material is chosen from thermoplastic elastomers, polyurethane, polyether block amine, copolyester elastomers, acrylic elastomers, or styrene elastomers.

4. The elastomer material according to claim 1, wherein the material is chosen from hot vulcanizable elastomers, fluoroelastomers, acrylonitrile butadiene copolymers, silicones, or ethylene propylene diene monomer.

5. The elastomer material according to claim 1, wherein the material is chosen from cold vulcanizable elastomers or silicones.

6. The elastomer material according to claim 1, wherein the hydrophilic microfibers have a fineness of less than 150 mTex.

7. The elastomer material according to claim 1, wherein the hydrophilic microfibers are made of a cellulosic material, cotton, linen, or from synthetic derivatives or viscose.

8. The elastomer material according to claim 1, wherein the hydrophilic microfibers have a cross-section with n channels, wherein n >2.

9. The elastomer material according to claim 8, wherein the cross-section of the hydrophilic microfibers has an oblong shape with grooves or a helical shape.

10. A method for manufacturing a wristband, comprising at least one portion made from an elastomer material, the elastomer material including at least hydrophilic microfibers, thermally conductive fillers, and an antimicrobial additive, wherein the method comprises:

forming a mixture from the elastomer material;

adding to the mixture obtained in the forming at least hydrophilic microfibers, thermally conductive fillers and an antimicrobial additive;

forming the wristband from the mixture obtained in the adding by a molding process, wherein the hydrophilic microfibers are made of a synthetic material from the polyamide or polyester family, and the hydrophilic microfibers form channels in the elastomer material to transport moisture by capillary action through the material.

11. The method according to claim 10, wherein the elastomer material is chosen from thermoplastic elastomers and vulcanizable elastomers.

12. A method for assembling a wristband obtained by the method according to claim 10, wherein the method comprises:

forming a first layer of a wristband intended to be in contact with the skin;

assembling an aesthetic layer on top of the first layer.

13. An assembly method according to claim 12, wherein the aesthetic layer is leather, fabric, polymer, or any other decorative element.

14. An elastomer material for wristbands or components for horology intended to be in contact with skin, the elastomer material comprising:

moisture wicking means, wherein the wicking means includes hydrophilic microfibers made of a synthetic material from the polyamide or polyester family, the microfibers forming channels in the elastomer material to transport moisture by capillary action through the material; and an antimicrobial additive of organic zinc compound or silver salts or aluminium salts type.

* * * * *